United States Patent [19]

Tourdot et al.

[11] 4,430,847

[45] Feb. 14, 1984

[54] COMBINE FEED REVERSER

[75] Inventors: Wayne M. Tourdot, Blue Springs; Larry A. Matthes, Independence, both of Mo.

[73] Assignee: Allis-Chalmers Corporation, Milwaukee, Wis.

[21] Appl. No.: 401,336

[22] Filed: Jul. 23, 1982

[51] Int. Cl.³ ............................................. A01D 69/00
[52] U.S. Cl. ...................................... 56/10.7; 56/11.2; 56/11.7; 474/1; 474/4
[58] Field of Search ...................... 56/10.7, 10.8, 11.2, 56/11.7, 11.8, 14.3, 14.5; 474/1, 4; 74/665 A

[56] References Cited

U.S. PATENT DOCUMENTS

| | | | |
|---|---|---|---|
| 3,973,379 | 8/1976 | Ecker et al. | 56/11.2 |
| 4,138,837 | 2/1979 | Love | 56/11.2 |
| 4,218,864 | 8/1980 | Allemeersch et al. | 56/11.2 |
| 4,237,983 | 12/1980 | Allen | 474/1 |
| 4,332,127 | 6/1982 | Staiert et al. | 130/27 H |

Primary Examiner—Gene Mancene
Assistant Examiner—David I. Tarnoff
Attorney, Agent, or Firm—Charles L. Schwab

[57] ABSTRACT

A combine (11) is provided with a feed reverser mechanism (81) to drive a pair of feeder conveyors (23, 24) and a header conveyor auger (46) in reverse when the operator detects a jammed condition in the feeder conveyors or auger. The reversing mechanism (81) includes a hydraulic drive motor (92), a wrap spring clutch (93) and a hydraulic actuator (142), which automatically increases the tension on a drive belt (68) when the conveyors (23, 24) and auger (46) are driven in a reverse direction by the hydraulic motor (92). A pump relief valve (191) prevents delivery of excessive torque to the conveyors (23, 24) and auger (46) during a feed reversing operation.

11 Claims, 5 Drawing Figures

COMBINE FEED REVERSER

BACKGROUND OF THE INVENTION

1. Technical Field

This invention relates to a reversing mechanism by which the feeder conveyors and header auger may be driven in a reverse direction to remedy a plugged or jammed condition.

2. Prior Art

The use of a mechanical gear-type change speed transmission to reverse the drive to the feeder conveyors and header of a combine is shown in U.S. Pat. No. 4,138,837. Such a transmission is relatively expensive and is capable of transmitting excessive torque to the feeder mechanisms during a feed reversing operation.

U.S. Pat. No. 4,218,864 shows a reversing means for a combine header drive wherein the feeder conveyor between the header and the threshing cylinder is driven in its normal crop feeding direction when the header auger is driven in a reverse direction.

BRIEF DESCRIPTION OF THE INVENTION

A feed reverser mechanism is provided in a mobile harvester for selectively reversing both the header and feeder conveyor mechanisms in event either of the header or feeder conveying mechanisms is jammed by a lump of crop material. The feed reverser mechanism includes a drive means selectively operable by the operator at the operator's station to cause a reversal of direction of the conveying of crop material in the conveyor mechanisms including a motor having a rotatable output member connected to a one-way clutch whose output member is connected to the conveyor mechanisms. The control means for selectively operating the motor means to cause reverse operation may include control logic preventing the engine from driving the conveyor mechanisms in their normal crop feeding direction when the motor means is operated to reverse the conveyor mechanisms. Also, a torque limiting means may be provided to prevent excessive torque transmission to the conveyor mechanisms during a feed reversing operation.

BRIEF DESCRIPTION OF THE DRAWINGS

One embodiment of the invention is illustrated in the drawings in which.

DETAILED DESCRIPTION OF THE INVENTION

Figure 1:
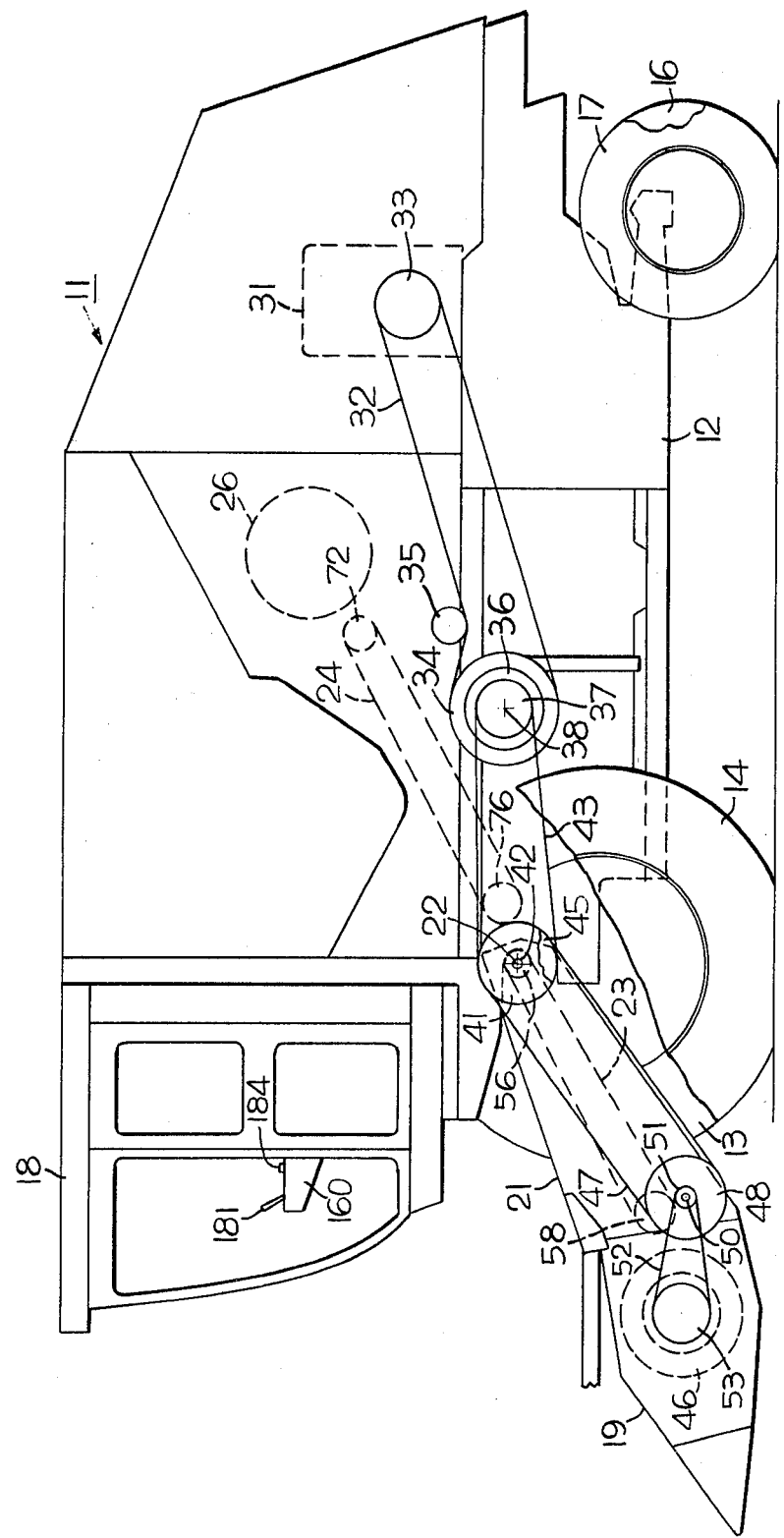
FIG. 1 is a left-hand side view of a combine.

Referring to FIG. 1, a combine 11 includes a main frame 12 which is supported at its front end by a pair of drive wheels 13, 14 and is supported at its rear end by a pair of steerable wheels 16, 17. An operator's station or cab 18 is supported on the main frame 12 in overlying relation to a header 19 and a feeder housing 21. The feeder housing 21 is secured at its front end to the header 19 and is pivotally connected to the main frame 12 at its rear end for swinging movement about a transverse axis 22. A lower feeder conveyor 23 is disposed within the feeder housing 21 and an upper feeder conveyor 24 moves crop material delivered to it by the lower feeder conveyor 23 to a crop processor or threshing mechanism 26. The traction wheels 13, 14 and the crop processing mechanism of the combine are driven by an engine 31 mounted at the rear end of the main frame 12. The drive train between the engine 31 and the drive wheels 13, 14 is not shown. A drive belt 32 extends between an engine-driven pulley 33 and a driven pulley 34 and is tensioned by an idler pulley 35. An electric clutch 36 serves to connect and disconnect a belt pulley 37 to the belt pulley 34, both of which rotate about a transverse axis 38. The pulley 37 drives a pulley 41 on a lower feeder conveyor drive shaft 42 on pivot axis 22 through an endless belt 43. The pulley 41 and a pulley 45 are secured coaxially to a transverse shaft 42. Pulley 45 drives a transverse auger 46 through a belt 47, pulley 48, pulley 51, belt 52 and pulley 53. Pulleys 48 and 51 are coaxially connected to a transverse shaft 50 and the pulley 53 is secured coaxially to the transverse auger 46. A drive drum 56 is secured to the feeder drive shaft 42 and drives a slat-type feeder conveyor 23 which passes around a lower idler drum 58.

Figure 2:
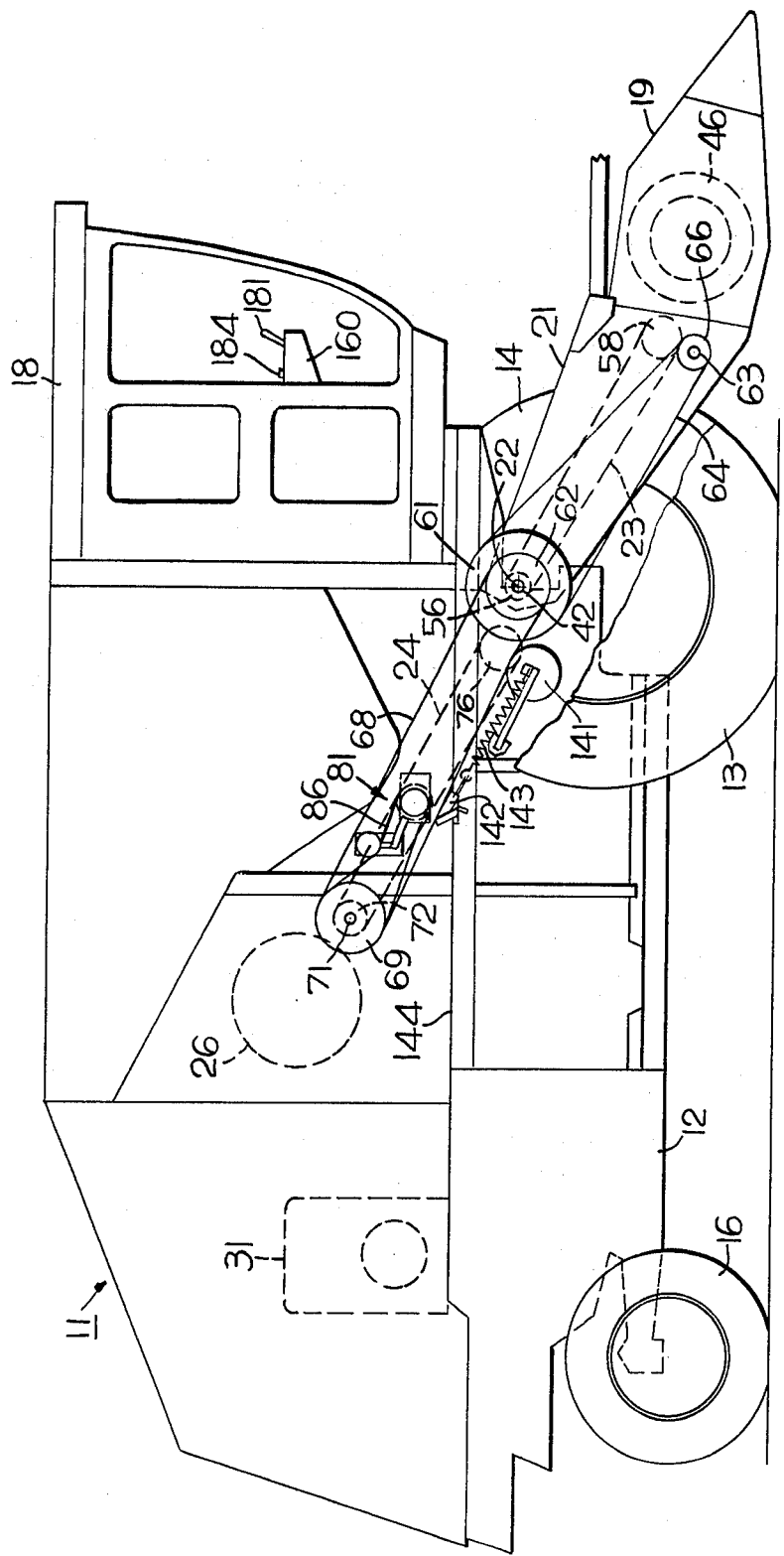
FIG. 2 is a right-hand side view of the combine shown in FIG. 1.
Figure 3:
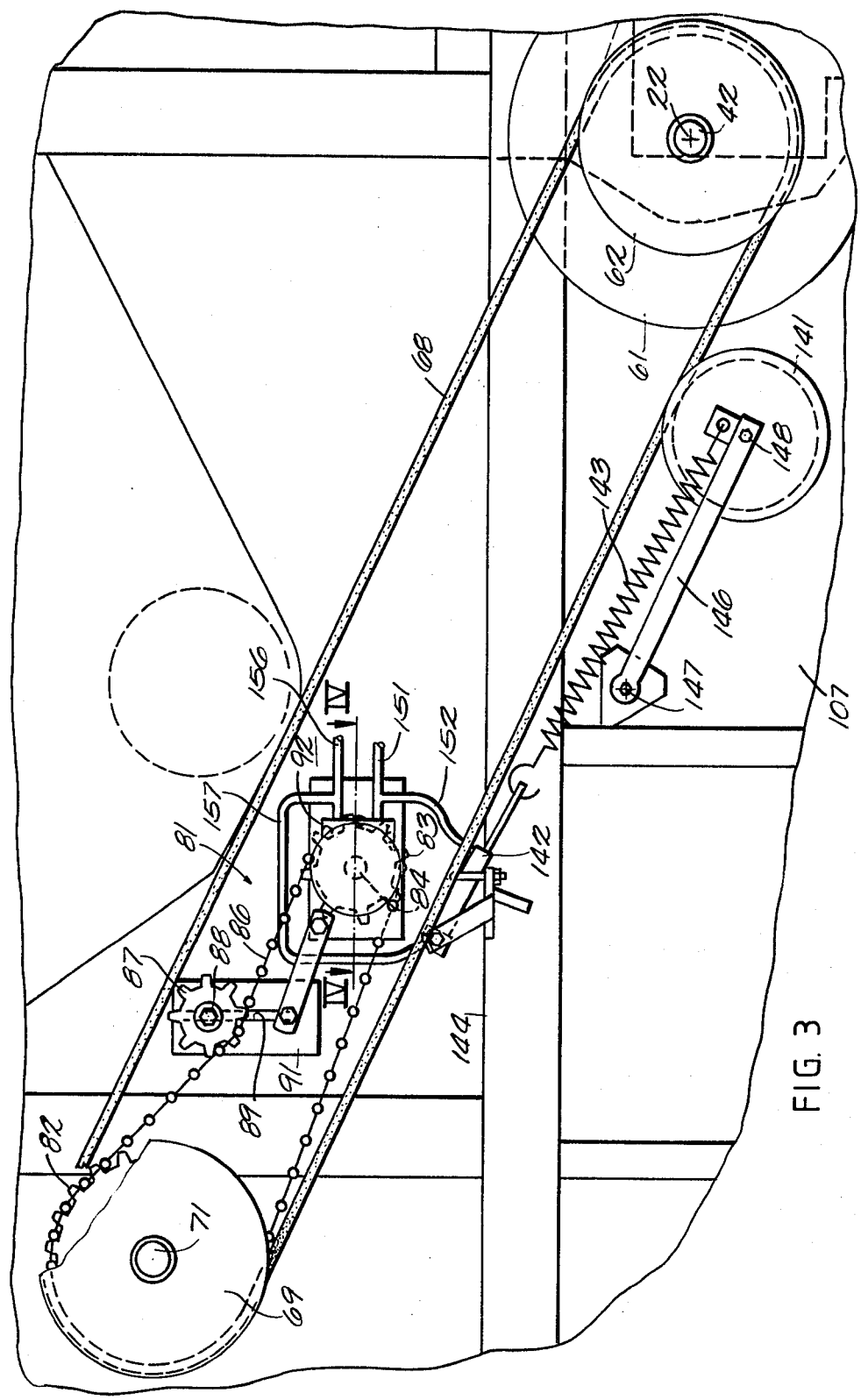
FIG. 3 is a partial right-hand side view of the combine illustrated in FIG. 2.

Referring also to FIGS. 2 and 3, the transverse shaft 42 at its right-hand end carriers a pair of belt pulleys 61, 62. Belt pulley 61 drives a lower transverse shaft 63 through a belt 64 and pulley 66. The transverse shaft 63 is provided to drive one of a pair of twin sickles through suitable drive means, not shown. The pulley 62 drives a belt 68 which drivingly engages a pulley 69 secured to a transverse drive shaft 71 of an upper feeder conveyor 24. A drive drum 72 is secured to the drive shaft 71 and drives the upper slat-type feeder conveyor 24 which passes around an idler drum 76.

Figure 4:
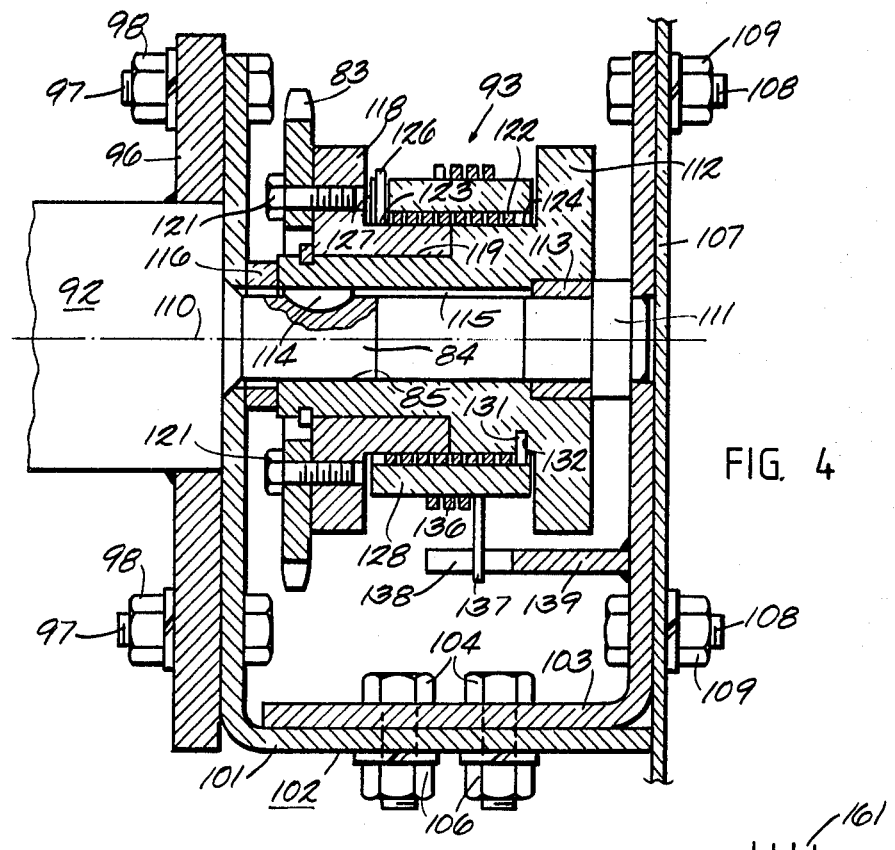
FIG. 4 is a view taken along the line IV—IV in FIG. 3.

Referring particularly to FIGS. 3 and 4, a feed reversing mechanism 81 is provided to selectively drive the upper conveyor 24, the lower conveyor 23, and the header conveyor in the form of auger 46 in a reverse direction in event of a jammed condition of any of these mechanisms, which condition may occur due to the presence of a large lump of crop material. The feed reverser mechanism 81 includes a sprocket 82 secured for rotation with the upper feeder drive shaft 71, a sprocket 83 secured to an output member 118 of a one-way wrap spring clutch 93 and an endless flexible drive chain 86 tensioned by an idler sprocket 87 whose mounting bolt 88 may be selectively positioned vertically along a slot 89 in an idler mounting bracket 91. An input member 112 of the one-way clutch 93 has an internal bore 85 which receives a shaft 84 of a hydraulic drive motor 92. The hydraulic motor 92 includes a mounting flange 96 secured by bolts 97 and nuts 98 to an L-shaped member 101 of a mounting bracket 102. The mounting bracket 102 also includes a second L-shaped member 103 secured to member 101 by bolts 104 and nuts 106. The L-shaped member 103 is secured to a sidewall 107 of the combine 11 by bolts 108 and nuts 109. A stub shaft 111 is welded to member 103 of the bracket 102 and rotatably supports the input member 112 on a transverse axis 110 through a suitable bushing 113. The input sleeve 112 is secured for rotation with the shaft 84 of the hydraulic motor 92 by a drift key 114 engaging a keyway 115 in the bore 85.

A spacer 116 and the bushing 113 ensure proper axial positioning of the input member 112. The output member 118 is rotatably supported on a reduced diameter portion 119 of the input member 112 and is secured to the sprocket 83 by cap screws 121. The mechanically actuated, instant release wrap spring clutch 93 includes a first coil spring 122 which is wrapped about equal diameter, coaxial surfaces 123, 124 of cylindrical members 118, 112. The spring 122 has one end 126 bent outwardly and disposed within an axial slot 127 in a loose-fitting sleeve 128 disposed in surrounding relation to the spring 122. The other end 131 of the spring 122 is disposed in a radially inwardly extending hole 132 in the clutch input member 112. When pressure fluid is admitted to the hydraulic motor 92, it rotates in a counterclockwise direction, as viewed in FIGS. 2 and 3, thereby causing the loose-fitting spring 136 to lightly grip the outer cylindrical surface of the sleeve 128 forcing the spring 122 to wrap tightly about the surfaces 123, 124 of the output and input members 118, 112. Thus, when the hydraulic motor 92 is operated, the one-way clutch automatically causes the input member 112 to drive the output member 118 and the sprocket 83 secured thereto. The sleeve 128 rotates with the one-way clutch and sprocket 83 when driven by the hydraulic motor 92. The spring 136 has a radially outwardly extending end 137 in cooperative engagement with a slot 138 in a stationary flange 139 welded to L-shaped part 103. Thus, the spring 136 does not rotate. When the hydraulic motor 92 is not driving the sprocket 83 through the automatic one-way clutch 93 and the conveyor mechanisms 23, 24 are being driven by the combine engine 31, the sprocket 83 will be driven by sprocket 82 through the flexible power transmitting element or chain 86 in a clockwise direction, as viewed in FIGS. 2 and 3 and the one-way clutch 93 automatically disconnects the sprocket 83 from the hydraulic motor shaft 84. When the reversing mechanism 81 is operated to drive the conveyors 23, 24 and header auger 46 in reverse direction to move a wad of crop material or the like from these feeding mechanisms of the combine, the drive belt 68 which normally drives the upper conveyor 24, will now be required to drive the lower conveyor 23 and the feeder auger 46. In order to properly achieve transmission of required increased torque, it is necessary to additionally tension the drive belt 68. This is achieved by increasing the spring bias on a belt idler 141 by use of a linear-type hydraulic actuator 142 having one end secured to an end of a tension spring 143 and its other end secured to the combine sidewall frame member 144. The spring 143 is connected to the lower swingable end of an idler support or lever 146 having its upper end pivotally connected on a transverse pivot axis 147 to the combine sidewall 107. The pulley 141 is pivotally carried on the lower end of the lever 146 by a pivot bolt 148. Electrohydraulic control means is provided to automatically retract the tension in the belt 68 through increased bias of the idler 141 whenever the feed reverser 81 is operated. This is achieved by connecting the hydraulic actuator 142 in parallel with the hydraulic motor 92 by way of a fluid pressure supply line 151 and a branch line 152. Any leakage past the piston of the hydraulic actuator 142 is carried to a return to reservoir conduit 156 by way of a branch conduit 157.

Figure 5:
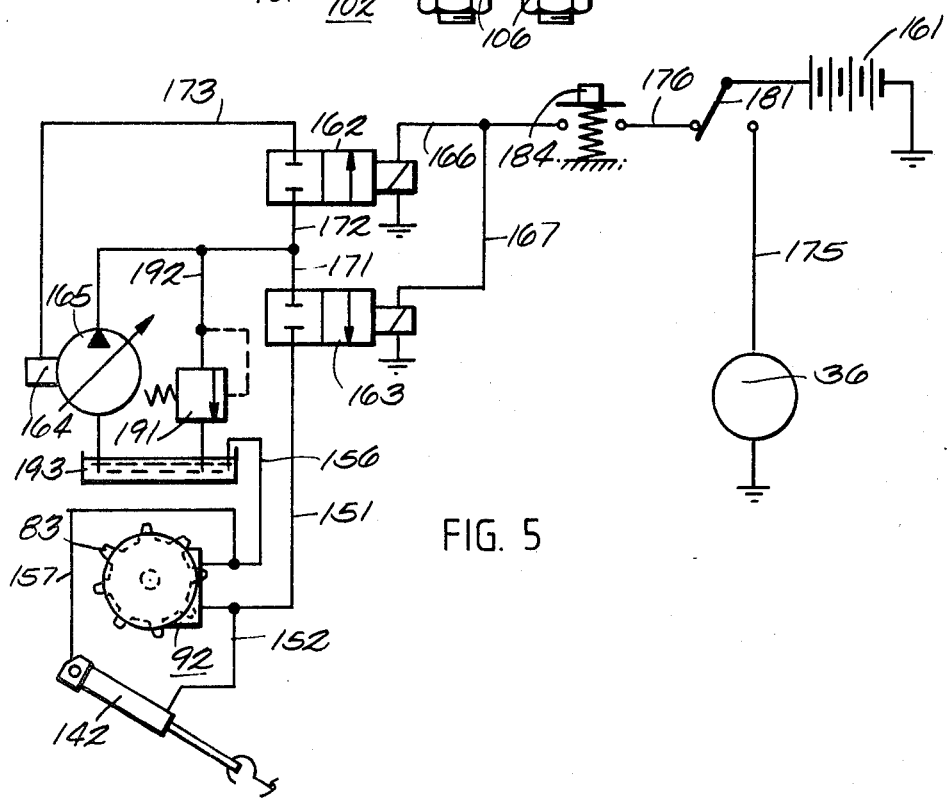
FIG. 5 is a schematic of an electrohydraulic control system for the feed reverser of this invention.

Referring to FIG. 5, an electrohydraulic control system is provided for operating the feed reverser mechanism 81 from a control console 160 at the operator's station 18. The control includes a suitable battery 161, a pair of solenoid valves 162, 163 and a source of pressure fluid comprising a swash plate pump 165. Solenoid valve 162, when energized, delivers pump output to a swash plate control 164 thereby stroking the swash plate pump 165 for delivery of sufficient pressure fluid to operate the hydraulic motor 92. Since the solenoid valves 162, 163 are electrically connected in parallel by leads 166, 167, both, when energized, will be moved to their pressure fluid delivering position, the pump will be stroked and fluid will be delivered to the hydraulic motor 92 to drive the sprocket 83 in a counterclockwise direction. Simultaneously, the actuator 142 will be contracted to increase the bias on the idler tensioning spring 143 thereby increasing the tension of the drive belt 68 so that it is capable of transmitting the driving torque necessary to operate the lower feeder conveyor 23 and transverse auger 46 without subjecting them to distructive forces. The pump 165 is connected to motor supply conduit 151 by a pump output or delivery conduit 171 via control valve 163. A branch conduit 172 connects output conduit 171 with the solenoid valve 162 and a conduit 173 connects the solenoid valve 162 to the swash plate control 164. The battery 161 may be connected to either the electric feeder drive clutch 36 via lead 175 or to a lead 176 of the electrical circuit for controlling the solenoid valves 162, 163 by a double-throw switch 181 at the console 160, which in its illustrated position of adjustment, connects the battery to the lead 176. When the switch 181 is moved counterclockwise, the battery 161 will be connected with the electric clutch 36. The switch 181 cannot connect both the electric clutch 36 and the feed reverser solenoid valve 163 to the battery at the same time. As illustrated, the operator has disconnected the electric clutch 36, thereby disconnecting the power from the engine 31 to the feeder conveyors 23, 24 and auger 46. In order now to operate the feeder conveyors 23, 24 and auger 46 in reverse, the operator will momentarily push the push button switch 184 at the console 160 to complete this electric circuit to the solenoid valves 162, 163.

In event a foreign object is severely jammed in one of the feed conveyors 23, 24 or the auger 46, torque delivered to these mechanisms by the feed reverser 81 is limited by a pump relief valve 191 in a return line 192 to the reservoir 193. The relief valve 191 insures that the pressure of fluid delivered by the pump 165 to the motor 92 does not exceed a predetermined value. Without this torque limiting means (relief valve 191) excess torque could be applied to the feeding mechanisms (conveyors 23, 24 and auger 46) with probable damage thereto. The present feed reverser 81 is relatively low cost, reliable, easy to service, has torque limiting means and is suitable for incorporation in a combine as optional equipment.

The embodiments of the invention in which an exclusive property or privilege is claimed are defined as follows:

1. In a mobile harvester having a header for removing crop material from a field being traversed, a crop processor, a feeder including a conveyor mechanism for moving crop material from the header to the crop processor, an engine, a power train connecting the engine to the conveyor mechanism to drive the latter in a crop feeding direction including a feeder clutch, the combination comprising,
   a feed reverser mechanism operable to drive said conveyor mechanism in reverse independent of power transmission through said power train, said feed reverser mechanism having drive means operable to drive said conveyor mechanism in reverse, including a motor means having a rotatable output member, control means for causing said feeder clutch to disconnect said engine from said conveyor mechanism and for effecting operation of said motor means, and an automatic one-way clutch operatively connecting said rotatable output member to said conveyor mechanism when said motor means is operated to drive said conveyor mechanism in reverse, said one-way clutch disconnecting said motor means from said conveyor mechanism when said motor means is not operated and said engine drives said conveyor mechanism through said power train in a crop feeding direction.

2. The combination of claim 1 and further including torque limiting means operatively associated with said drive means automatically limiting the amount of torque transmitted by said feed reverser mechanism to said conveyor mechanism.

3. The combination of claim 2 wherein said motor means is a hydraulic motor.

4. The combination of claim 3 wherein said feed reverser mechanism includes a source of pressure fluid connected in fluid delivery relation to said motor and said torque limiting means includes a relief valve operatively associated with said source of pressure fluid whereby the pressure of fluid delivered to said motor does not exceed a predetermined value.

5. In a mobile harvester having a header including a conveyor mechanism, a crop processor, a feeder including a conveyor mechanism for moving crop material from the header to the crop processor, an engine, a power train connecting the engine to the conveyor mechanisms to drive the latter in a crop feeding direction, including a feeder clutch, the combination comprising, a feed reverser mechanism operable to drive said conveyor mechanisms in reverse independently of power transmission through said power train, said feed reversing mechanism having drive means operable to drive said conveyor mechanisms in reverse, including a hydraulic motor having an output shaft, a one-way clutch operatively interconnecting said output shaft and said conveyor mechanisms whereby the latter are driven in reverse when said hydraulic motor is operated, said one-way clutch serving to disconnect said hydraulic motor from said conveyor mechanisms when the latter are driven in said crop feeding direction by said power train, and control means for selectively operating said hydraulic motor including control logic insuring disengagement of said feeder clutch when said hydraulic motor is operated.

6. The combination of claim 5 wherein said drive means includes a belt drive having an endless belt and a spring-biased tensioning means operatively associated with said endless belt and further comprising means automatically adjusting said spring-biased tensioning means to increase the tension of said drive belt when the conveyor mechanisms are driven in a reverse direction.

7. The combination of claims 5 or 6 wherein said feed reverser mechanism includes a source of pressure fluid connected in fluid supplying relation to said motor and means limiting the pressure of fluid supplied to said motor to a predetermined value whereby the reverse drive torque delivered to said conveyor mechanisms is limited to avoid damage to the latter.

8. The combination of claim 5 wherein said one-way clutch is a mechanically actuated instant release wrap spring clutch which automatically disengages when said hydraulic motor is not operated and said conveyor mechanisms are driven in a crop feeding direction.

9. A mobile harvester having a header for removing crop material from a field being traversed including a conveyor mechanism, a crop processor, a feeder including a conveyor mechanism for moving crop material from the header to the crop processor, an engine, a power train connecting the engine to the conveyor mechanisms to drive the latter in a crop feeding direction including a selectively operable feeder clutch having engaged and disengaged conditions, said harvester characterized by, a feed reverser mechanism operable to drive said conveyor mechanisms in reverse independent of power transmission through said power train, said feed reverser mechanism having drive means operable to drive said conveyor mechanisms in reverse, including motor means having a rotary output torque delivering member, a one-way clutch operatively connecting said torque delivering member to said conveyor mechanisms when said motor means is operated, said one-way clutch preventing transmission of torque to said motor means by said conveyor mechanisms when the latter are driven by said engine through said power train, and control means for selectively operating said motor means, including control logic insuring disengagement of said feeder clutch when said motor means is operated, said one-way clutch automatically disengaging said motor means from said conveyor mechanisms when said feeder clutch is engaged to drive said conveyor mechanisms.

10. The combination of claim 9 wherein said drive means includes a belt drive having an endless belt and adjustable belt tensioning means and means causing said adjustable belt tensioning means to increase the tension of said belt when said feed reverser mechanism is operated.

11. The combination of claim 9 wherein said drive means includes a belt drive having an endless belt, a belt idler engagable with said belt, an idler support rotatably supporting said idler and shiftable to increase the tension of said belt upon movement in a predetermined direction, a hydraulic actuator operatively connected to said idler support to cause movement thereof in said predetermined direction upon being supplied pressure fluid, and means effecting delivery of pressure fluid to said actuator when said motor means is operated to drive said conveyor mechanisms in reverse.

* * * * *